Figure 1:
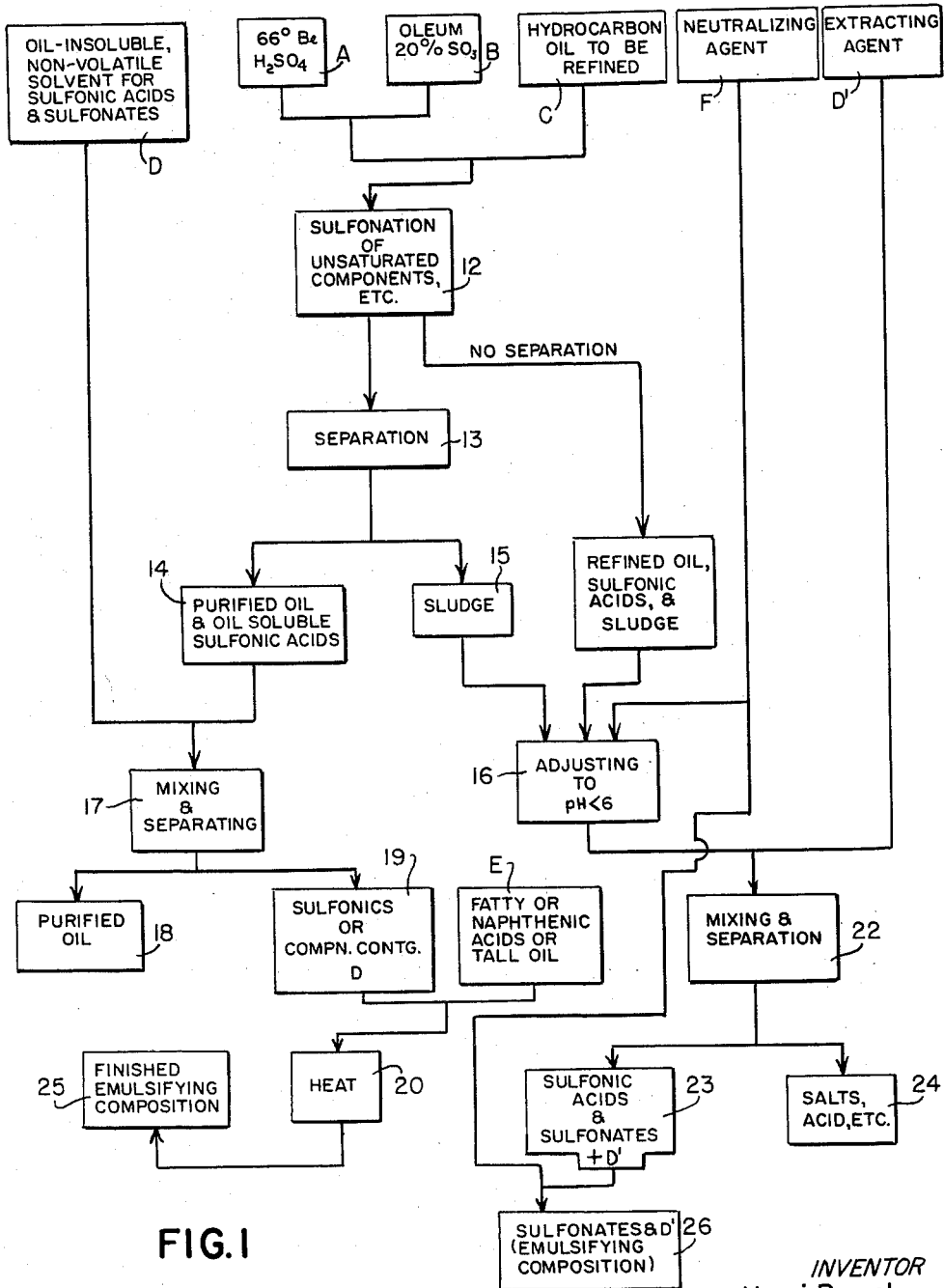

INVENTOR.
Henri Brunel

United States Patent Office 3,149,063
Patented Sept. 15, 1964

3,149,063
PROCESS OF REFINING HYDROCARBON MINERAL OILS
Henri Brunel, 9 Rue du General Niox, Paris, France
Filed May 7, 1962, Ser. No. 192,935
Claims priority, application France Apr. 14, 1955
10 Claims. (Cl. 208—13)

This invention relates to processes for refining hydrocarbon oils and to the recovery of surface active products as by products of the process.

This application is a continuation-in-part of U.S. application Serial No. 573,334 filed March 23, 1956, now abandoned.

In the known processes for refining mineral oils with sulphuric acid, a great part of the unsaturated compounds in the oil is converted by the sulphuric acid into a sludge with is separated from refined oil and eliminated. The production of sulfonic acids or sulfonates is a secondary result. In the present process, the refining of hydrocarbon oils results in the production of utilisable and commercially useful compositions containing sulphonates in addition to the desired purified oil. That part of the hydrocarbon oil treated which does not emerge as purified oil is entirely converted into pure sulphonates or into said purified compositions containing sulfonates. Furthermore, no volatile solvent is used for extracting sulphonates, either from refined oil or from sludge and the products employed to extract sulphonates are so chosen that they may be allowed to remain with the sulphonates as components of the aforesaid compositions and of the finished products. In other words, emulsifying compositions which ordinarily contain sulphonates may be obtained directly by the process of the invention.

Thus, among the objects of the invention is to provide a process for sulfuric acid refining of hydrocarbon oils, especially petroleum oils, including oils contaminated by use in the lubrication of motors and machines, in electric transformers or in any other use, and also the oily residues from the refining of mineral oils by solvents.

Among other objects of the invention is to provide a process for recovering valuable by-products from the refining of hydrocarbon oils and for substantially completely eliminating problems connected with the disposal of sludges resulting from the acid purification process.

The objects of the invention are attained by treating impure or contaminated oils with a sulphonating reagent containing sulfuric acid, and thereafter extracting valuable sulfonic acids or compounds thereof from the oil phase and/or separating other valuable sulfonic acid or compounds thereof from the sludge phase. According to one method of carrying out the invention, the oil phase and sludge phases are separated before recovering the sulfonates therefrom. According to another method, the sulfonates are recovered from the intermixed sludge and oil phases. At certain stages of the process, the sulfonic acid compounds may be present as sulfonic acids, per se, or sulfonates or partially as sulfonic acids and partially as sulfonates. Thus, it is often convenient to refer to such sulfonic acid compounds as "sulfonics" or "sulfonic compounds."

One phase of the invention is based on the discovery of a complete system for substantially completely eliminating all waste organic products and instead recovering substantially all of the organic chemical components in the form of useful compounds.

Another phase of the invention is based on the discovery of processes for separating very useful sulfonic acids or compounds thereof from the sludge fraction or from the intermixed sludge and oil fractions obtained after the sulfuric acid treatment of impure or contaminated hydrocarbon oils so that the problem of disposing of the sludge is completely eliminated and instead useful products are obtained from it.

Further objects and advantages of the process will be apparent from the more detailed description thereof below, and the process will be more clearly understood when considered in connection with the accompanying drawing in which, FIG. 1 is a simplified flow sheet showing the main steps of the system of the present invention.

Figure 2:
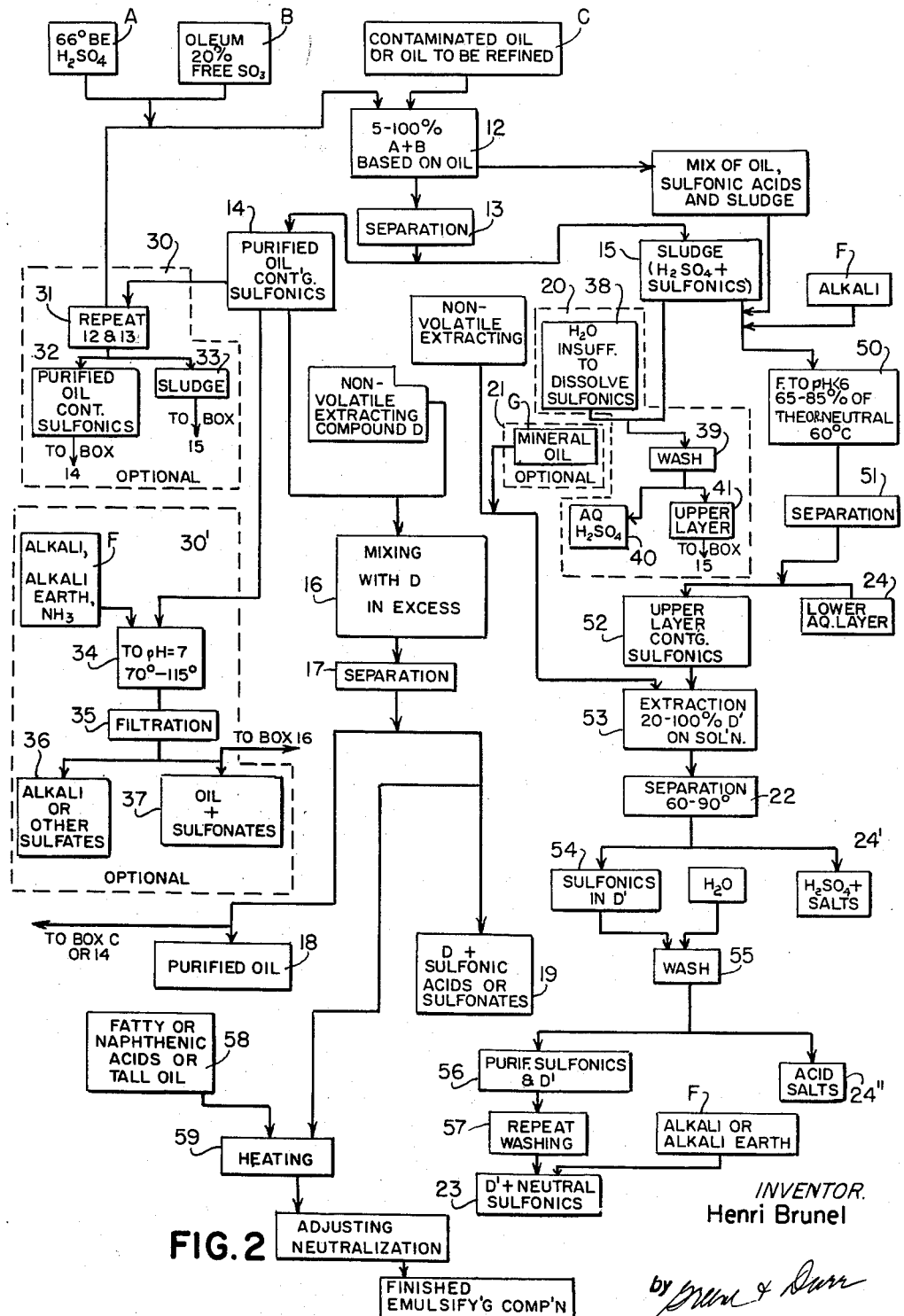

FIG. 2 is a flow sheet of the process which shows details thereof as set forth in certain of the specific examples described below.

As indicated in FIG. 1, the unrefined or contaminated oil "C" is treated with a sulfuric acid purifying agent, such as sulfuric acid A and/or oleum B. The oil-acid mixture is agitated and may then be separated (as shown in box 13) into two phases either by standing or by centrifuging to provide the purified oil 14 which contains dissolved sulfonic acids (the lighter phase) and the sludge 15 which contains excess sulfuric acid together with generally water-soluble sulfonic acids and possibly other water-soluble or acid soluble compounds. The process described, thus far, is very similar to the first steps of the conventional processes of preparing white oils from petroleum oils although according to the present invention the acidic materials A and B are so selected and proportioned as to produce reaction products in the sludge, etc., which are essentially sulfonic acids, or sulfonates after neutralization.

According to the present invention, the oil soluble sulfonic acids are extracted from the oil fraction 14 by means of a non-volatile extractant liquid or solvent for the sulfonates which extractant liquid is also insoluble in the oil fraction 14. Thus, the extractant D is mixed with the oil fraction 14 in suitable proportions and the phases which are then separated at 17 comprise a purified oil 18 and a sulfonate or sulfonic acid composition. Preferably, the extractant D is selected so as to act as a complement to the sulfonics of oil fraction 14 and produce an excellent surface active composition which can be marketed as such without further separation or purification. For example, the composition 14 or 19 may be heated with fatty or naphthenic acids or tall oil to provide a very excellent emulsifying composition similar to that obtained from the sludges by the process of the invention which is described below. The oil fraction 18 can be further purified by activated earth.

The sludge fraction 15 is partially neutralized with an alkaline agent F as shown at 16, is then extracted with a non-volatile sulfonic-acid-dissolving agent D', and by the action of these agents, separated as shown at 22 into a sulfonic composition 23 and various salts, etc., 24. The sludge separation is subject to many modifications and detailed steps which are described below but FIG. 1 shows the broad process steps together with the resultant products. Unless otherwise specified, it will be understood that all proportions stated are by weight.

The sulfonating reagents A and B are chosen and proportioned so as to produce only sulfonic acids and no substantial amount of useless products. To some extent, the selection of A and B depends on the oil being treated and on the degree of purification desired in the final product. A reagent mixture of A and B which is suitable for practically all oils is 66° Bé sulfuric acid (as A) to which up to 200% (preferably, 10 to 200%) of oleum containing 20% or more of free sulfuric anhydride is added. The quantity of the reagent mixture A and B depends on the degree of purification desired and will vary among the different oils to be treated. Thus, for obtaining pure white oil from the oils known as spindle oils or from solvent extracted oils, at least two successive treatments each with 100% by weight of the sulfonating mixture are desirable; for industrial white oils one treatment with 20–40% of the sulfonating agent is adequate; for regenerating contaminated motor oils one treatment with 2% of the sulfonating reagent (for precipitation of dirt) and another treatment with 8–10% of the reagent is very satisfactory; for regenerating turbine oils one treatment with 5–20% of the reagent is satisfactory; for treating the oily residues obtained from the refining of hydrocarbon oil by solvent extraction, (for instance with $SO_2$), one treatment with 20–100% of the reagent and a similar treatment with a sulfonating agent of increased $SO_3$ content (still less than 20%) is desirable. Where two or more successive treatments are performed, the $SO_3$ content of the reagent for the later treatments is preferably increased and pure oleum may be used for the last treatment. Thus, the quantity of sulfonating agent per treatment may vary from about 2–100% depending on the oils to be treated and the results desired. When a sulfonating agent of high concentration of $SO_3$ is employed, the quantity of the sulfonating agent required is less.

The sulfonating reagent is added progressively and at such a rate and under rapid agitation to maintain a temperature below the temperature at which reduction reactions begin with the formation of sulfurous anhydride but above the temperature at which the reagent begins to act as a sulfonating reagent. A very satisfactory temperature range has been found to be 20 to 75° C., preferably 20–60° C., according to the composition of the oil and of the reagent, but, between 40 and 60° C. reduction reactions may take place when using a reagent concentrated in $SO_3$ so that, in most cases, the last range of temperature is between 20° and 40° C. especially when a reagent concentrated in $SO_3$ is used. The reaction involved is exothermic and no outside heating is required.

Where the oils are subjected to more than one sulfonating reagent, extracting step 17 may be conducted between the separate sulfonating treatments or only one extracting step may be conducted after several sulfonating treatments. Similarly, the sludges obtained from each sulfonating treatment may be combined and treated together to recover sulfonic acids, etc., therefrom or each sludge may be treated separately.

A very satisfactory temperature for maintaining the mixture during the separation step 13 is at around 40° C. Said temperature may vary according to the viscosity of the oil. When the separation is conducted by allowing the mix to stand, a period of 10 to 12 hours is adequate for viscous oils and of 2 to 4 hours for fluid oils. Of course, the separation can be conducted immediately by centrifuging.

The extractant D is non-volatile under the conditions of the treatments and also preferably odorless and colorless. For the purpose of this specification and claims, a non-volatile liquid will be understood to be one which has a boiling point above 100° C.

The extractant liquid D is so selected as to either form a solution with the sulfonic acids of the separated oil phase 14 which is insoluble in the oil or to combine with the sulfonic acids to form a combination which is insoluble in the oil. Thus, the extractant D is itself preferably insoluble in the separated oil phase 14 at the temperature of the treatment.

The proportion of extracting compound required is generally less than 10% by weight of the treated oil and usually 5–6% is adequate. Obviously, however, larger amounts can be employed.

As indicated, the extractive agents for the sulfonic acids in the oil fraction 14 include two broad types, those which combine or react with the sulfonic acids and those which dissolve the sulfonic acids and sulfonates.

Among the extractive compounds D which combine with sulfonic acids, those giving the best result as to recovery of said sulfonic acids are aminoalcohols (such as ethanolamines or propanolamines) and especially polyaminoalcohols. These act both as neutralizing agents by their basic properties and as solvents producing neutral sulfonates and solutions of neutral sulfonates in an excess of the aminoalcohol, said sulfonates and solutions of sulfonates being insoluble in refined oils. Besides, these compounds are best adapted for completing the surface active properties of the sulfonates by condensation (as disclosed below) with other compounds or molecules. Triethanolamine, especially is very satisfactory in substantially all cases. Its solvent properties towards sulphonic acids and sulphonates obtained from hydrocarbon oils are very high and the sulphonates of triethanolamine and their solutions in triethanolamine, are just as triethanolamine itself, quite insoluble in refined hydrocarbon oils under the conditions of temperature chosen, according to the process, for settling or centrifuging. Said insolubility may be further increased, by employing an aminoalcohol such as triethanolamine in admixture with 10–50% of water or still better, with water and a water soluble alcohol (such as methanol, ethanol or isopropanol) in the same proportion. Furthermore, the solvent is still more improved with respect to its extraction properties for sulfonates in viscous oils by employing an aqueous or aqueous-alcohol mixture of the aminoalcohol and a soap of the aminoalcohol such as is obtained by adding a fatty acid, (preferably a fatty acid which is liquid above 20° C.) or naphthenic acid, or tall oil to an aqueous alcoholic solution of the aminoalcohol. Some aminoalcohols, particularly triethanolamine, are completely colourless and odourless, this being very important when the production of very pure oils is desired. Furthermore, the sulfonates of triethanolamine and similar aminoalcohols are surface-active products of high quality and the small amount of triethanolamine sulphate or similar sulfate which may remain mixed with said sulfonates has not the inconveniences of metal sulfates. As stated above, any excess of the aminoalcohol in which the sulfonates are dissolved may be, (when preparing, for instance, a finished emulsifier) combined with fatty acids or naphthenic acids or tall oil in order to produce soaps and (by heating said soaps) esters that complement the surface-active properties of the extracted sulfonates in said preparation of an emulsifier for hydrocarbon oils. Said esterification solubilizes for oil, the oil-insoluble mixture of the aminoalcohol in excess with sulfonates and the emulsifier obtained in this way (composed of sulfonates and esters of triethanolamine or a similar aminoalcohol) is then of the same type as the emulsifiers resulting from the treatment of acid sludges as will be described hereafter. If desired, alkali or alkaline earth sulfonates can be obtained by a double decomposition reaction.

Among the extractive products D which are only solvents of sulfonic acids giving with said sulfonic acids (or with sulfonates in the variation comprising treatment after neutralization and filtration) solutions insoluble in refined oils, the better adapted to the process are: polyalcohols (for example, glycerol or ethane-diol) esters of fatty acids (for example, glycerides), hydroxy fatty acids (for example, ricinoleic acid), sulfonic acids (for example, sulfo oleic or sulfo ricinoleic acid). In this case also, esters suitable for complementing the properties of sulfonates may be obtained from polyalcohols by heating the extracted solution of sulfonates with, for instance, fatty or naphthenic acids or tall oil. When operating with sulfonic acids, these are also preferably chosen so that their properties complete or complement the properties of the sulfonates obtained from hydrocarbon oils. For obtaining products having special anti-corrosion properties, liquid, non-volatile amines and polyamines may also be employed as extractive agents, for example, diethylene triamine or solutions of ethylene diamine. All the cited extractive reagents are added in relatively small proportion and they need not be removed from the extracted sulfonates.

As already stated above, according to a feature of the invention, purified compositions which contain sulfonates and which are soluble in both water and in oils (having particularly good solubility in mineral oils) are obtained from the sludge layer 15 which, in conventional processes, is ordinarily discarded or burned. The sludge layer 15 is first partially neutralized to a pH which is still about or less than 6 by an alkaline reagent. For example, about 65–80% of the amount of alkaline reagent required for complete neutralization is added to the sludge layer 15.

Suitable neutralizing agents include the alkali and alkali earth hydroxides and carbonates such as sodium, potassium, lithium, calcium, strontium, barium, etc., hydroxides or carbonates. Ammonium hydroxide or ammonia is a very satisfactory neutralizing agent inasmuch as it produces ammonium sulfate which is more valuable than sodium sulfate. Besides, the ammonium sulfonates which may be formed are easily converted into any other sulfonate, on account of the volatility of the base. It will be understood that the term "alkaline neutralizing reagent" includes ammonium, as well as alkali metal and alkali earth metal hydroxides and carbonates.

As indicated below, in the discussion of FIG. 2, a separation of the partially neutralized sludge 15 may be obtained if allowed to stand at 40–60° C., such separation comprising a lower layer 24 containing sulfuric acid and/or metal salts and an upper layer 23 (which is still acid) containing sulfonics.

Either the partially neutralized sludge 15 as a whole or the separated sulfonic acid containing layer thereof is then treated with a non-volatile liquid extractant D'. When extractant liquids of high viscosity are used, the extractant liquid D' may be dissolved in mineral oil to reduce its viscosity (see G of FIG. 2). About 20–100% of the extractive compound, exclusive of any oil addition is very satisfactory, the exact proportion depending on the sludge being treated. The non-volatile extractant D' is selected so as to produce a solution of sulfonic acids which is insoluble in the aqueous acid phase and which does not form a stable emulsion with said aqueous acid phase. Also, the non-volatile extractive agents are selected so as to be adapted to form an active component in the sulfonic acid composition obtained from the sludge. The extractive agent previously heated to 95° C., for example, is added while actively agitating to the partially neutralized sludge and the mixture is brought to about 60°–100° C. Then said mixture is allowed to settle or is centrifuged as shown at 22. During standing or centrifugation, the mix is maintained at about 60°–90° C. The lower or heavier layer which separates from the mix contains aqueous sulfuric acid and metal salts and the upper layer comprises a solution of sulfonics in the extractant liquid. Further purification steps may be added as described in connection with FIG. 2.

The better extractants D' in substantially all cases, whatever may be the treated hydrocarbon oil, and the acid sludge coming from said treated oil, have been found to be amido alcohols obtained by condensation while heating of fatty or naphthenic acids, or tall oil with an aminoalcohol and especially the product obtained by condensation of (distilled) tall oil with monoethanolamine, diethanolamine or, still better, with monoisopropanolamine. These extractants may be added by themselves or, as already stated, in mixture with a mineral oil of low viscosity, such as spindle oils. Other products obtained by condensation of liquid fatty acids or naphthenic acids or tall oil with other amino alcohols are also very satisfactory, but are generally of higher price.

Among other extractive products which have been found to be suitable for extracting sulfonic acids and sulfonates from acid sludges according to the process, are: fatty acids or tall oil and their amides and soaps; naphthenic acids and their amides and soaps; the esters of fatty acids, tall oil, naphthenic acids and especially mono- and/or di-esters of said acids and triethanolamine; the polyethylene or polypropylene glycols of molecular weight 300 to 600 and/or their condensation products with fatty acids or with organic hydroxy compounds such as fatty alcohols, alkyl phenols; sulpho fatty acids and sulpho hydroxy fatty acids, all those extractive products being used alone or mixed with each other and/or mixed with mineral oil of a low viscosity such as spindle oil.

Mixture of several of the cited extractive products may be advantageous. For instance, mixtures of amides obtained by condensation of isopropanolamine and tall oil and mono- and/or di-esters obtained by condensation of triethanolamine and tall oil are very satisfactory. Said mixtures are especially satisfactory when the sulfonates to be extracted are very soluble in water.

As indicated in FIG. 1, substantially all of the sulfonic acids and/or sulfonates may be recovered from the oil and acid phases before these phases are separated. In this modification of the process, the unseparated oil-sludge mixture after the sulfuric acid has combined with the unsaturated or other colored components of the oil at 12 is treated directly at step 16 to partially neutralize the mix to a pH which is still less than 6. This mix is then treated as if it were the acid sludge, the water, salts, etc., being separated as shown in box 24.

In FIG. 2, the boxes which correspond to those of FIG. 1 have the same numbers. As shown in the dotted area 30 the once purified oil may again be sulfonated at 31 to produce a further purified oil 32 which may then be subjected to the other operations for the oil phase 14. Or, the once or twice purified oil may be neutralized as shown in optional area 30' by neutralizing agent F, which may be alkali, or alkali earth or ammonium hydroxide or carbonate, at 70–115° C. as shown in box 34, then filtered as shown at 35 to remove the sulfates formed by neutralization and provide the purified oil fraction 37 which is then treated as shown in boxes 16–19 already described with respect to FIG. 1.

Similarly, the sludge fraction may be optionally treated as shown in optional area 20 by washing at 39 with water 38 or with an aqueous alkaline solution in insufficient amounts to dissolve the sulfonics, to recover an aqueous sulfuric acid or bisulfate fraction 40 and provide a layer 41 of reduced acidity which is then treated as sludge 15.

The sludge 15 with or without washing as at 20, is partially neutralized by neutralizing agent F to a pH which is still less than 6. On standing or by centrifuging as at 51 a lower aqueous layer 24 and an upper layer 52 may be obtained. This upper layer 52, or the whole mixture when no separation is obtained are extracted by extractant D' which may include oil 21 and separated at 22 to provide a lower layer 24' (similar to layer 24) and an upper layer 54 containing sulfonics and the extractant D'. This phase 54 is washed at 55 with hot water and the resultant mix separated to provide the lower layer 24'' and the purified sulfonics containing D' as shown at 56. The washing may be repeated as indicated at 57 and finally the washed solution is neutralized with an alkaline reacting agent to produce the neutral sulfonics 23.

In each of the separation stages 51, 22, 55 and 57, the pH of the mix should be below 6, otherwise separation into two phases may not take place. If, at any time, the pH rises above 6, acid is added to reduce the pH accordingly. For reducing the pH, once it has increased to a value above 6, any acid can be employed but a mix with reduced corrosiveness can be provided by adding acids which form salts that protect against corrosion such as nitrous, boric, chromic and salicylic acids.

The product 23 is a limpid, brown and neutral liquid of syrupy consistency which is soluble in both water and in oils and is especially soluble in mineral oils when neutralized with alkali bases or carbonates and only soluble in oil when neutralized with alkali earth bases or carbonates. It is emphasized that the surface-active composition thus obtained is of the same type as those obtained after heating the product extracted from the oil phase with fatty or naphthenic acids or tall oil. Pure sulfonates may be obtained by precipitating the same by addition of solvents for the extractant in which the sulfonates are insoluble.

The process is useful for the purification of any sulfonate derived from a hydrocarbon oil, even from synthetic hydrocarbon oils such as, for example, alkyl benzene or alkyl naphthalenes or tetrapropylin benzene etc., and more generally, from any sulphonatable hydrocarbon oil, even synthetic. The process is also useful for purifying sulfonated products obtained from vegetable or animal oils especialy with a view to obtaining similar compositions as above containing said sulfonated products.

Examples of the industrial refining and the production of surface active products, according to my process will now be given.

*Example 1.*—1,000 kilograms of spindle oil of a viscosity about 2, 5 to 3° Engler at 50° C., are treated, while agitating with a turboagitator, by adding progressively 1,000 kilograms of the reagent consisting of the mixture of 500 kilograms of sulfuric acid of 66° Baumé strength and 500 kilograms of oleum containing 20% of free $SO_3$, the temperature being maintained under 60° C. and preferably between 20 and 60° C. When the sulphonation has come to its end (half an hour to one hour after the addition of sulfuric acid is completed), the mixture is allowed to stand at about 40° C. for at least three hours. Then, the two layers formed are separated. To the separated upper oily layer consisting of about 700 kilograms of refined oil containing sulfonic acids, there are added, at 60° C., while agitating, 35 kilograms of triethanolamine. When the mixture takes an orange hue, the agitation is stopped and the liquid is centrifuged or allowed to settle at a temperature around 40° C. In the case of settling, the two layers are separated after the sulfonates are completely precipitated. The upper or lighter fraction consisting of 650 kilograms of refined white oil may be filtered or centrifuged to remove the remaining sulfonates. The filtrate is decolorized by heating with activated earth and again filtering. The lower or heavier layer contains sulfonates of triethanolamine and excess of triethanolamine. This lower layer has several applications, such as in the preparation of emulsifying agents or soluble mineral oils, especially when heated with fatty or naphthenic acids or tall oil in order to obtain from the oil insoluble mixture of triethanolamine sulfonate and the excess of triethanolamine, an oil soluble surface active composition comprising said sulfonates and esters coming from the condensation of the triethanolamine in excess with the fatty or naphthenic acids or with the tall oil. When an alkylolamine, with the hydrogen on the nitrogen not entirely replaced by alkylol radicals, is employed for precipitating the sulphonates, for instance, diethanolamine, the surface active composition obtained is made up of sulfonates and amido alcohols instead of esters. The sulfonates thereof may also be converted to barium or calcium sulfonates for use as detergents or in special cutting oils.

To the separated lower sludgy layer (corresponding to 15) there are added 500 kilograms of water, progressively, while mixing. Cooling is desirable if the temperature reaches 60° C. The mixture of sludge and water is allowed to stand until two layers are formed, the temperature being maintained at about 40-60° C. Then the lower aqueous acid layer (40) is decanted and the upper sludgy layer is neutralized by mixing with a solution of sodium hydroxide at 20% concentration, added progressively. The quantity of said solution used is limited to 70% of the total quantity necessary to obtain complete neutralization in order that the pH remains below 6 in the following operations. The temperature, at the end of the addition of the neutralizing solution may be allowed to reach 60 to 75° C. One may decant if an aqueous layer separates. Then, without waiting, there is added rapidly, a mixture of 450 kilograms of the isopropanolamide of tall oil (D') (preferably bidistilled tall oil) dissolved in 450 kilograms of spindle oil (G), the mixture of oil and extractive agent having previously been brought to about 95° C. After a few minutes of very active agitation, there is obtained a homogeneous or almost homogeneous mixture. Said mixture is allowed to stand at a temperature between 70° and 85° C., until two layers are perfectly separated. The lower layer (24') is then decanted. To the upper layer 54, there is added, 1,500 kilograms of water brought to 90–100° C., while actively agitating, until a homogeneous or almost homogeneous mixture is obtained. Said mixture is allowed to stand at a temperature between 75° and 85° C. until two layers are perfectly separated and a drop of the upper layer remains perfectly limpid after cooling, when observed in bright light. The washing may be repeated in the same conditions several times according to the degree of purity required for the final product. Generally, after two successive washings, inorganic acids and metal salts are completely removed. When, after several washings, the separation of the two layers becomes difficult, it is necessary to add one to five percent of an acid diluted with water, in order to bring the pH below 6 again. All the separations effected after settling, as described above, may be accelerated by centrifuging. Finally, the mixture of sulfonic acids and sulfonates 56 obtained with isopropanolamide of tall oil for extraction of said sulfonic acids is completely neutralized by addition, while stirring, of a solution of sodium hydroxide at a concentration of 50% or of a solution of potassium hydroxide at a concentration of 60%. There is finally obtained about 1,200 kilograms of a brown, transparent syrup soluble in water, to give a very fine emulsion, as well as in oils and especially soluble in mineral oils to give a transparent solution. Said syrup has several applications; it is especially useful as a base for preparing soluble oils or emulsifiers for mineral oils. Transparent solutions of this syrup in mineral oils give perfectly white emulsions with water. However, the emulsifying power of the product, as well as its solubility in any mineral oil, can be highly increased by addition of products of adjunction, especially 20 to 50% of the monoester or a mixture of the mono- and diesters of triethanolamine and of a fatty acid such as oleic acid or distilled tall oil.

In order to obtain a product giving clear and perfectly transparent solutions both in water and in oils and especially in mineral oils, there may be added to the emulsifier composed of extracted sulfonic acids and of the products used to extract them according to the process, a suitable quantity (usually 25 to 40%) of naphthenic acids which are neutralized in the final neutralization.

In order to obtain a very desirable mixture for preparing detergent lubricating oils and special oils for cutting, the neutralization of the brown transparent syrup obtained as stated above, after washing with hot water, is effected by heating with the crystalline hydrate (preferably ground to a fine powder) of barium hydroxide. One obtains a thick syrup which is perfectly soluble in oils and especially in mineral oils but insoluble in water.

If desired, pure sulfonates alone are precipitated from the syrup 23 by solvents such as, for instance: petroleum ether or white spirit in which sulfonates are insoluble and in which the extractive product is soluble.

In order to avoid the production of $SO_2$ which may occur when washing acid sludge 15, said acid sludge may be directly neutralized by introduction of said sludge progressively and while agitating, into a solution of sodium hydroxide in order to neutralize $SO_2$ in the presence of a great excess of alkaline solution so that it does not escape into the atmosphere as is the case when the alkaline solution is added to the sludge. The concentration of said solution of NaOH is about 20% and the quantity of said solution is limited (as before) to 70% of the weight of the solution necessary to obtain complete neutralization, the temperature being maintained below 60° C. Lime wash may be used instead of NaOH solution.

*Example 1A.*—The process is conducted as in Example 1 except that the sludge phase is not separated from the oil phase. The entire mixture from box 12 (FIG. 2) is partially neutralized with 65–85% of the alkaline reagent required for complete neutralization and treated as the mixture from box 50 (FIG. 2) or as the sludge of Example 1 is treated after partial neutralization. Thus, all of the sulfonics in the oil phase as well as in the sludge phase are recovered with oil as a composition for obtaining the final emulsifier.

*Example 1B.*—The process is conducted as in Example 1 but the oil treated is a solvent extracted basic oil of a viscosity of 6° to 7° Engler at 50° C. or a more fluid oil of a viscosity of 2 to 3° Engler at 50° C., for instance oils known under the commercial appellations of "Lubstark" or "Coastal," and the reagent used in oleum containing 20% of free $SO_3$ with a view to obtaining pure white oils and pharmaceutical oils, several treatments according to the process being successively effected until pure oils are obtained.

*Example 2.*—1,000 kilograms of the sticky, oily residue obtained by refining petroleum oils by solvent extraction with $SO_2$ or phenol or furfural (for instance, the commercial products known under the registered trademarks Dutrex and Nuso or Iranolin) are sulfonated according to the method described in Example 1. After standing, if two layers are formed (this often occurs when treating light products coming from refining fluid oils by solvent extraction with liquid $SO_2$) the two layers are separated. The upper layer is treated by addition of triethanolamine, as in Example 1, but the proportion of triethanolamine added is often higher and may reach 15 to 20%. One or two other treatments by sulfuric acid and extraction by triethanolamine may be successively effected. Finally, the separated purified oil, after distillation and/or treatment by activated bleaching earth, give a clear light oil having high solvent properties. The extracted sulfonates are often brown especially when coming from extracts of solvent refining with liquid $SO_2$. As to the lower layer formed by the acid sludge, the sulfonic acids it contains are extracted as in Example 1 and the emulsifier obtained has the same properties and may have the same applications as those obtained from the spindle oil treated in Example 1 though they usually are of a darker color.

*Example 3.*—1,000 kilograms of the contaminated motor oil removed from automobile motors are treated, for cleaning, first with 20 kilograms of sulfuric acid at 66° Baumé strength or by the reagent added according to Example 1 for sulfonation. After centrifuging or settling, the small amount of sludge obtained is eliminated. The oil is then treated by 80 kilograms of the reagent obtained by mixing 40 kilograms of sulfuric acid of 66° Baumé strength and 40 kilograms of oleum containing 20% of free $SO_3$, the treatment being effected as in Example 1. After settling for at least four hours at 40–45° C., the two layers formed are separated. The upper oily layer is treated by 50 kilograms of triethanolamine as in Example 1 and then separated after standing at a temperature between 40° and 60° C. or by centrifuging. The upper or lighter refined motor oil fraction separated from the sulfonates, is treated by 0.5 to 3% of its weight of activated bleaching earth, at 120° C., while agitating, and then filtered under pressure. There is obtained an excellent re-refined motor oil, perfectly transparent, of a light yellow color and having a good viscosity not much lower than the viscosity of the original motor oil. The separated sulfonates are of a red-brown, clear color. On account of the molecular weight of the oil from which they come, they have a high molecular weight and they are useful in the same applications as those obtained in Example 1, especially when high molecular weight sulfonates are required, i.e., for obtaining emulsions of asphalt. The clear sludge obtained after sulfonation is treated as in Example 1 and gives a final product containing the sulfonates extracted from the sludge together with the extractive product. This mixture is especially useful where high molecular weight sulfonates are desirable.

*Example 4.*—1,000 kilograms of shale oil are treated as described in Example 1. For obtaining pure oil, several treatments by sulfuric acid are effected. When it remains of a brown color, the obtained purified shale oil is finally distilled to obtain clear oil having a high solvent power. The sludges are treated as in Example 1.

*Example 5.*—The sludges coming from the treatment of light products, such as gas oil, light or medium fractions coming from distillation of lignites, benzola, etc., are treated as in Example 1, but the treatment by sulfuric acid is adjusted, especially in the case of benzenic compounds, to the particular properties of said light products so as to avoid too high a rate of sulfonation such as would decrease the proportion of the refined product obtained. Sulfuric acid at 66° Baumé strength mixed with 4 to 8% of oleum having 20% of free $SO_3$ is a suitable sulfonation reagent.

*Example 6.*—When operating as in Example 3, but with a contaminated oil which is a light oil for transformers instead of contaminated motor oil, the treatment of the oily layer decanted after sulfonation is conducted with another amino alcohol instead of triethanolamine, for instance triisopropanolamine or, for the treatment of highly paraffinic oils, monoethanolamine or monoisopropanolamine, etc., when these are not soluble in the refined oil under the conditions of operation of the process. A simple test will establish the solubility of the extractant. The quantity of amino alcohol to be used being less important when the molecular weight of said amino alcohol is lower, there is an advantage, in using, when possible, ethanolamines and especially monoethanolamine or diethanolamine.

*Example 7.*—In the above examples, for the treatment of the oily layer decanted after sulfonation of a light paraffinic oil, there is added as an extractant, instead of triethanolamine or another amino alcohol, 3 to 10% of glycerol or about the same amount of ethane diol, preferably mixed with water.

*Example 8.*—When operating as in Example 1, there are added for the treatment of the oily layer decanted after sulfonation of a light spindle oil of a viscosity lower than 2° Engler at 50° C., instead of triethanolamine, 5% to 12% of sulphoricinoleic acid, the sludges being treated as in Example 1.

*Example 9.*—After sulfonation of 1,000 kilograms of the spindle oil as set forth in Example 1, there are added 200 kilograms of oleic acid or 200 kilograms of ricinoleic acid or 200 kilograms of tall oil in order to obtain, besides sulfonic acids derived from mineral oil, sulpho oleic or sulpho ricinoleic acid, by reaction with the excess of sulphuric acid. Then, the operations are conducted as in Example 1A.

*Example 10.*—1,000 kilograms of spindle oil of the type set forth in Example 1, or of more viscous oil (i.e., an oil for lubrication of a viscosity about 4 to 5° Engler at 50° C. or a solvent extracted oil of a viscosity of 3 to 7° Engler at 50° C.) are treated as in Example 1. After separation from the acid sludge, the upper oily layer is neutralized by progressive addition, at a temperature between 80° and 115° C., while agitating, of powdered sodium carbonate, in the proportion of 4 to 10% of the weight of the treated oil. Sodium sulfonates being soluble in refined oil are dissolved by said refined oil and a filtration at 30–40° C. eliminates the precipitated sodium sulfate and excess of sodium carbonate which are insoluble in refined oil. The yellow oil resulting from said filtration is then treated by 4 to 8% of triethanolamine at 40–60° C., while agitating, and is then allowed to stand or is centrifuged to separate the insoluble phase containing pure sodium sulfonates in triethanolamine. According to the use that is to be made of said sulfonates, the triethanolamine may be removed, left or converted into a soap or into an ester of a fatty acid or of tall oil by simple addition of said fatty acids or of tall oil and heating, the sulfonates acting, in this last case, as a catalyst for the reactions giving esters from triethanolamine and the acid added. The mixture of sulfonates with soaps and/or esters, thus obtained, constitutes a high quality product soluble in any oil for emulsifying or special lubricating purposes. In the variation according to this example, other cited reagents may be added instead of triethanolamine. Besides, by neutralizing the oil separated from acid sludges, after sulfonation, with barium hydroxide, and filtering, there is obtained a solution of barium sulfonates in refined oil suitable for use as a cutting oil. It may be diluted by addition of oil.

*Example 11.*—In the examples above, there are added to the acid oil separated or to the whole acid mixture after acid treatment or to the sludge after separation, fatty acids and especially oleic acid, tall oil, liquid fatty acids from fish, etc., in order to obtain mixtures of sulfonated fatty acids with sulfonic acids derived from hydrocarbon oil which are then treated according to the process as set forth for the oil filtrate and for the sludge phase or for the mixture of both phases.

*Example 12.*—In the above examples, for the treatment of the acid sludge according to the process, there is added a heat-condensation product of an amino alcohol such as monoethanolamine with fatty acids or tall oil or naphthenic acids or a glyceride at the step 53, when extracting the sulfonic acids.

*Example 13.*—In Examples 1 to 12, in the treatment of the acid sludge according to the process, there are employed as extractive agents, esters obtained by the condensation of fatty acids or tall oil or naphthenic acids with an amino alcohol such as triethanolamine or triisopropanolamine.

*Example 14.*—In Examples 1 to 12, for the treatment of the acid sludge according to the process, there is employed, a high boiling solvent comprising a mixture of an amido alcohol (obtained by condensation of an amino alcohol such as mono or di ethanolamine, mono or diisopropanolamine, with fatty acids, tall oil, or naphthenic acids) and esters obtained by condensation of fatty acids, or tall oil, or naphthenic acids with an amino alcohol such as triethanolamine or triisopropanolamine, said mixture constituting the extractive agent.

*Example 15.*—In the examples above, for the treatment of the acid sludge according to the process, there is employed, as extractive agent, a high boiling solvent for the sulfonic acids and sulfonates comprising a polyethylene or polypropylene glycol or a condensation product of a glycol such as polyethylene or polypropylene glycol with fatty acids, tall oil, naphthenic acids, or alkyl phenols, these compounds being employed alone or in admixture with the amido alcohols and esters disclosed in Examples 11–14 above, for example.

*Example 16.*—1,000 kilograms of dodecyl benzene or a similar synthetic product with higher molecular weight are treated as in Example 1 with at least 1,600 to 1,800 kilograms of a reagent composed of half weight of sulfuric acid at 66° Bé and half weight of oleum at 20% of $SO_3$. Very little of the oil remains unsulfonated. These sulfonic acids are treated in the same manner as the sludge in Example 1 in order to obtain a final product containing purified sulfonates in solution in the extractive product and soluble both in water and in oils and especially in mineral oils. The same treatment may be effected with any sulfonatable synthetic hydrocarbon oil.

The features and principles underlying the invention described above in connection with specific exemplifications will suggest to those skilled in the art many other modifications thereof. It is accordingly desired that the appended claims shall not be limited to any specific feature or details thereof.

I claim:

1. In a process for obtaining commercially useful products from substantially all of the organic ingredients of the two liquid phases obtained in the refining of an oil selected from the group consisting of synthetic and natural mineral oils by treating with a sulfonating reagent consisting essentially of sulfuric acid having an acid content at least equal to that of 66° Bé sulfuric acid, said two phases comprising a first phase containing oil and oil soluble sulfonic compounds and the second phase containing aqueous sulfuric acid with water soluble sulfonic compounds, the steps comprising, treating said first separated phase with a high boiling solvent consisting essentially of an oil-insoluble alkylolamine which is solvent for the sulfonic compounds, separating the two phases resulting to provide a lighter phase consisting essentially of refined oil and a heavier phase comprising the alkylolamine and the sulfonic acid compounds, adding to said heavier phase an organic acid compound having a carboxyl functional group selected from the group consisting of higher fatty acids containing up to 18 carbon atoms, tall oil and naphthenic acid, heating said heavier phase to esterify the organic acid compound with the excess of alkylolamine.

2. A process for producing commercially useful products from substantially all of the organic ingredients contained in the acid sludge phase obtained in the refining of an oil selected from the group consisting of synthetic and natural mineral oils by treating at 20–75° C. with a sulphonating reagent consisting essentially of sulfuric acid with an acid content at least equivalent to that of 66° Bé sulfuric acid, said acid sludge phase containing aqueous sulfuric acid and water-soluble sulfonic compounds, comprising steps of incompletely neutralizing said acid sludge phase with 65 to 80% of alkaline neutralizing reagent necessary for complete neutralization so that the pH of the mixture is below 6, maintaining the mixture at a temperature of about 40° to 60° C. whereby two phases are produced, eliminating the heavier aqueous phase, adding a non-volatile organic extractive composition consisting essentially of an amido alcohol obtained by condensation of an acid selected from the group consisting of higher fatty acids containing up to 18 carbon atoms, naphthenic acid and tall oil with an aminoalcohol thereby dissolving the sulfonics from said partially neutralized sludge and forming a separate phase with respect to the inorganic acids and metal salts, agitating the mixture containing the non-volatile extractive composition and the sludge at a temperature of about 60–100° C., separating a first heavier inorganic phase from the second lighter phase comprising the sulfonics and the extractive composition, thereafter completing the neutralization of the separated second lighter phase.

3. A process for producing commercially useful products from substantially all of the organic ingredients of the acid sludge phase obtained in the refining of an oil selected from the group consisting of synthetic and natural mineral oils by treating with a sulphonating reagent consisting essentially of sulfuric acid with an acid content equal to at least that of 66° Bé sulfuric acid, said acid sludge phase containing sulfuric acid, and sulfonic acid compounds, comprising the steps of incompletely neutralizing said acid sludge phase with 65 to 80% of alkaline neutralizing reagent necessary for complete neutralization so that the pH of the mixture is below 6, said alkaline reagent comprising as an essential ingredient anions of a metal selected from the group consisting of alkali and alkali earth metals, maintaining the mixture at a temperature of about 40° to 60° C. whereby two phases are produced, separating the heavier aqueous phase, adding to the lighter phase a non-volatile extractive composition selected from the group consisting of amido alcohols and esters obtained by the condensation of amino alcohols with products containing molecules having the carboxyl functional group consisting of higher fatty acids containing up to 18 carbon atoms, tall oil, and naphthenic acid, agitating the resultant liquor, and maintaining the temperature thereof at about 60° to 90° C. whereby two phases are produced, separating a first heavier aqueous phase containing sulfuric acid and metal salts from the second lighter phase comprising the extractive product, and sulfonic acid compounds, washing the separated, second lighter phase with water at 60° to 90° C. and separating the wash water therefrom, and thereafter completing the neutralization of said second lighter phase by adding a relatively concentrated neutralizing agent to provide a neutral product.

4. The process as claimed in claim 3 in which at least the final neutralization is carried out with an alkali base to provide a neutral final product which is soluble in both oil and water.

5. The process as claimed in claim 3 in which at least the final neutralization is carried out with an alkaline earth base to provide a neutral final product which is soluble in oil but not soluble in water.

6. A process for refining hydrocarbon oil compositions and obtaining commercially useful products from substantially all of the organic ingredients thereof comprising treating said hydrocarbon oil composition with 2–100% of a sulfonating reagent consisting essentially of sulfuric acid with an acid content equal to at least that of 66° Bé sulfuric acid to thereby form a mix with a first phase containing oil and oil-soluble sulfonic acid compounds and a second phase consisting essentially of a sludge containing sulfuric acid and dissolved sulfonic compounds, partially neutralizing said phases to a pH of up to 6, thereafter extracting said partially neutralized phases with a high boiling solvent for the sulfonic compounds thereof selected from the group consisting of amido alcohols and esters resulting from the condensation of amino alcohols with organic compounds having a carboxyl functional group selected from the group consisting of higher fatty acids containing up to 18 carbon atoms, tall oil and naphthenic acid.

7. The process as claimed in claim 6 in which the hydrocarbon oil treated is an alkyl aromatic synthetic hydrocarbon oil.

8. The process as claimed in claim 6 wherein said first and second phases are separated before extracting with said high boiling solvent for the sulfonic compounds, said second phase being extracted while at a temperature of 40–60° C.

9. The process as claimed in claim 6 wherein said first and second phases are separated after extracting with said high boiling solvent for the sulfonic compounds.

10. A composition of matter having surface active properties consisting essentially of a high boiling liquid selected from the group consisting of amido alcohols and esters obtained by the condensation of amino alcohols with an organic product containing a carboxyl functional group selected from the group consisting of higher fatty acids containing up to 18 carbon atoms, tall oil and naphthenic acid, said liquid containing dissolved therein sulfonic acids and sulfonates, said composition being obtained by the process of claim 6.

References Cited in the file of this patent
UNITED STATES PATENTS

| | | |
|---|---|---|
| 2,028,185 | Bird | Jan. 21, 1936 |
| 2,238,478 | Ott | Apr. 15, 1941 |
| 2,286,725 | Goodloe | June 16, 1942 |
| 2,416,192 | Mertes | Feb. 18, 1947 |
| 2,519,930 | Riethof et al. | Aug. 22, 1950 |
| 2,695,272 | King et al. | Nov. 13, 1954 |
| 2,757,194 | Hutlo et al. | July 31, 1956 |
| 2,800,503 | Crosby et al. | July 23, 1957 |

OTHER REFERENCES

Alrosol Alrose Chemical Company, Providence, Rhode Island, 1946, 252–NID.

Surfactants Listed, by John W. McCutcheon in Soap and Chemical Specialties, December 1957, page 64.